April 16, 1957     F. WEBER     2,788,622
SHARPENER ATTACHMENT
Filed Dec. 12, 1955
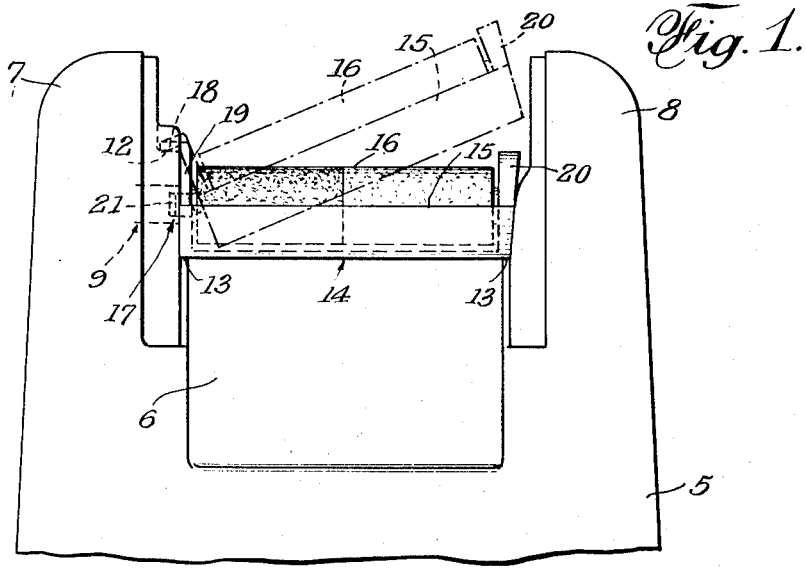
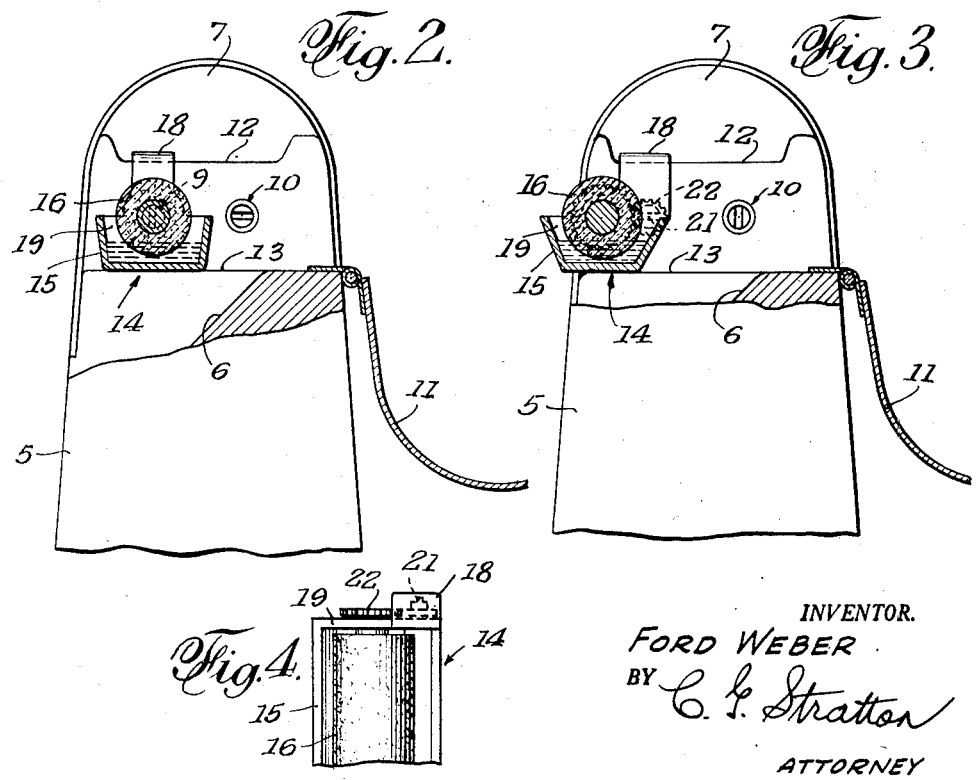
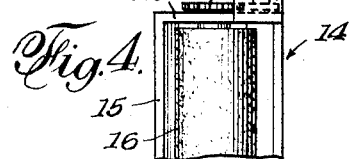
INVENTOR.
FORD WEBER
BY C. E. Stratton
ATTORNEY

| United States Patent Office | 2,788,622
Patented Apr. 16, 1957 |
|---|---|

2,788,622
SHARPENER ATTACHMENT

Ford Weber, Tarzana, Calif.

Application December 12, 1955, Serial No. 552,381

6 Claims. (Cl. 51—241)

This invention relates to a sharpener attachment particularly for machines having a rotational drive, and more particularly for a machine that tenderizes streaks and other cuts of meat by passing the same between blade-provided rollers.

Meat tenderizers usually comprise a housing in which is included a drive mechanism that imparts rotational movement to a pair of drive collars. A pair of blade-provided rollers are driven by said collars in a direction to draw a slice of meat therebetween and, in the process, cut into the tough fibers of said slice to tenderize the same. Usually, such machines are provided with blade-cleaning combs that also serve as guides for the slices of meat. Such combs may be separate elements or combined in a unitary manner with both rollers. In either case, said rollers and combs are removably mounted on the housing which is provided with offsets, shoulders, grooves, or slots that cooperate with the combs to hold the same non-rotationally.

An object of the present invention is to provide a knife sharpener attachment that is adapted to be connected to and driven by one of said drive collars and utilizes the offsets, shoulders, grooves, slots, as the case may be, to retain a proper operative position on the machine housing.

Another object of the invention is to provide a sharpener attachment that utilizes the drive of a tenderizer machine to rotate its sharpener roller and utilizes portions of the machine frame or housing to hold the liquid-holding pan component of the sharpener immovable during drive of the roller.

A further object of the invention is to embody a speed-changing drive between the output of the machine and the sharpener roller.

A still further object of the invention is to provide a speed-changing drive that forwardly offsets the sharpener roller with respect to the axis of the drive collar of the machine, thereby moving the roller to a more forward and convenient position.

The invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description. However, the drawing merely shows, and the following description merely describes, preferred embodiments of the present invention, which are given by way of illustration or example only.

In the drawing, like reference characters designate similar parts in the several views.

Fig. 1 is a front elevational view of the upper portion of a meat tenderizer as provided with one form of sharpener attachment according to the present invention.

Fig. 2 is an end elevational view partly in vertical section.

Fig. 3 is a similar view of a modification.

Fig. 4 is a broken plan view of the attachment shown in Fig. 3.

The tenderizer machine that is illustrated comprises a frame or housing 5 that is formed to have a chute 6 defined between transversely spaced standards 7 and 8. While not shown, said housing 5 embodies a drive mechanism that has a pair of drive collars 9 and 10 as the output. As shown, said collars are spaced so as to hold and drive interfitting meat tenderizing rollers that normally span between the standards 7 and 8 and downwardly feed a slice of meat onto chute 6.

The machine is provided with a hinged cover or hood 11 that normally encloses the tenderizer rollers and can be swung to the out-of-the-way position indicated in Figs. 2 and 3. It is through a top opening in this cover that the slices of meat are fed into the machine. When said cover is swung out of the way, the rollers may be disconnected from drive collars 9 and 10. As before indicated, said rollers are provided with cleaning combs which may be separately mounted in the machine or provided as part of a unitary device that includes the rollers. The shoulders 12 and 13 shown on standard 7 are exemplary of means that are already part of the machine that may be used in connection with the present sharpener attachment, since different models of tenderizer machines embody different forms of shoulders, offsets, grooves, notches, etc.

In any case, the basic machine comprises a twin-standard frame, a drive element, such as collar 9, provided in one of the standards, and means 12 and 13, or the like.

The present sharpener attachment 14 comprises, generally, a tray or pan 15, a sharpener roller 16, and a driving connection 17 between the roller and drive collar 9. As shown in Figs. 3 and 4, said connection 17 may be such as to either increase or decrease the speed of roller 16 with respect to the speed of collar 9 and also offset the roller forwardly from the axis of collar 9 to provide improved knife-presenting space that is partly clear of the forward portions of the standards 7 and 8.

The tray or pan 14 may be formed, as desired, to hold a quantity of liquid which may vary according to the type of sharpener stone or abrasive used for the roller. Said tray substantially spans between the standards 7 and 8 and is located by engagement with shoulders 12 and 13, which retain the tray against rotation. In this case, the tray is formed to have an end flange that may be engaged with shoulder 12 and around which the tray may be swung or tilted, as shown by the dot-dash lines into and out of operating position.

Said tray is provided with opposite end walls 19 and 20 to provide bearings for the opposite ends of sharpener roller 16 and also to substantially interfit with the opposed faces of standards 7 and 8.

Located in the above or a similar manner, the tray is held removably yet non-rotationally in the base frame or machine.

The sharpener roller is disposed longitudinally in the tray so that at least the lower portion thereof is immersed in any liquid that may be placed in said tray. Said roller is made of a knife-sharpening material of which emery, carborundum and sandstone are examples. As shown in Fig. 1, one end of the roller may be more roughened than the other end so that a knife may first be rough ground and then finish sharpened, as can be understood.

Said roller is rotated by the drive connection 17 which is shown in Fig. 1 as a trunnion extension 21 on one end of the roller, the same having driving engagement with the drive collar 9.

In the modification of Figs. 3 and 4, the roller 16 is offset forwardly with respect to the trunnion 21 and gearing 22 is interposed as indirect means to connect the roller and trunnion. Thus, the roller can be speeded up or slowed down relative to the speed of the drive collar 9. Also, this form of the invention locates the roller 16 forwardly, as can be seen in Fig. 3, thereby facilitating a sharpening operation which is performed by holding a knife (or other such tool) in such presentation to the surface of roller 16 that the edge thereof is sharpened.

While the foregoing has illustrated and described what are now contemplated to be the best modes of carrying out our invention, the constructions are, of course, subject to modification without departing from the spirit and scope of the invention. It is, therefore, not desired to restrict the invention to the particular forms of construction illustrated and described, but to cover all modifications that may fall within the scope of the appended claims.

Having thus described my invention, what I claim and desire to secure by Letters Patent is:

1. In combination with the housing of a tenderizer machine having a drive member and spaced standard portions provided with shoulders, the improvement therewith of a knife sharpener attachment comprising a liquid-holding tray removably engaged with said shoulders, said ray spanning between the standard portions and held nonrotatably thereby, and a sharpener roller journalled in said tray and having a separable driving connection with the drive member.

2. In the combination of claim 1: gearing being interposed between the drive member and the roller, said gearing being carried by the tray.

3. In the combination of claim 1: gearing being interposed between the drive member and the roller to offset the axis of the roller from the drive member, the direction of offset being toward the front of the machine.

4. In combination, a pair of spaced standards, one of which is provided with a rotationally driven member, both standards having abutment portions, the improvement therewith of a knife sharpener attachment comprising a liquid-holding tray removably engaged with said shoulders, said tray spanning between the standard portions and held non-rotatably thereby, and a sharpener roller journalled in said tray and having a separable driving connection with the drive member.

5. In the combination of claim 4: gearing carried by the tray and interposed between the driven member and the roller to offset the axis of the roller from the drive member.

6. In combination with the housing of a tenderizer machine having a drive member and spaced standard portions provided with shoulders, the improvement therewith of a knife sharpener attachment comprising a liquid-holding tray removably engaged with said shoulders, said tray spanning between the standard portions and held non-rotatably thereby, and a sharpener roller journalled in said tray and having a separable driving connection with the drive member, said roller being of sufficient diameter to be partially immersed within the liquid in said tray.

References Cited in the file of this patent

UNITED STATES PATENTS 1,718,961     Humphrey _____ July 2, 1929